Patented Oct. 29, 1946

2,410,089

UNITED STATES PATENT OFFICE 2,410,089

PRESSURE-SENSITIVE ADHESIVE TAPE

William E. Lundquist and Waldo Kellgren, St. Paul, Minn., assignors to Minnesota Mining & Manufacturing Company, St. Paul, Minn., a corporation of Delaware No Drawing. Application August 17, 1944, Serial No. 549,963

8 Claims. (Cl. 117—122)

This invention relates to an improved pressure-sensitive adhesive sheet, conveniently in the form of an adhesive tape, having a flexible unified paper backing provided with a coating of eucohesive pressure-sensitive adhesive. By eucohesive is meant that the adhesive is more cohesive than adhesive, but still tacky.

Paper backings for pressure-sensitive adhesive tapes have previously been unified with impregnating compositions comprising broken-down rubber and rosin. Such compositions adhere well to paper fibers, are high in internal strength, are sufficiently compatible with lacquer solvents and the like so that lacquer deposited upon the back surface of the finished tape will be held thereon and will not run off onto the adjacent margin of the area being lacquered, and in general are such as to produce adequately unified and otherwise desirable paper backings for pressure-sensitive adhesive tapes.

However these prior art unified backings, being somewhat sensitive to lacquer solvents, do not possess a high degree of resistance to solvent penetration, or of "bleedproofness", i. e. resistance to the penetration through the backing of coloring material from colored lacquers. Furthermore the impregnation of the paper being usually carried out from hydrocarbon solvents adds to the expense of the operation and creates explosion hazards which require extra precautions and equipment.

Paper backings for pressure-sensitive adhesive tapes have also previously been unified by impregnating with aqueous solutions of glue plasticized with glycerine. Such backings are for all practical purposes entirely resistant to penetration by lacquer solvents but possess the disadvantage of being sensitive to changes in humidity.

Vinyl acetate is a readily available low cost and hence highly desirable raw material which may be polymerized, either alone or together with other unsaturated and polymerizable materials, to form synthetic polymers. Polyvinyl acetate alone is a hard, tough solid which may be plasticized with various suitable liquid plasticizers to form soft masses which might be used for the unification of paper. But these compositions, due to the migration of the plasticizer from the vinyl acetate polymer, may cause softening and weakening of pressure-sensitive adhesive films in contact therewith, and hence are not satisfactory for use in unified paper backings for pressure-sensitive adhesive tape. Vinyl acetate has been copolymerized with methyl and ethyl esters of maleic and fumaric acids, but these copolymers are even less flexible than unmodified polyvinyl acetate and are likewise unsuited for the unification of paper backings for pressure-sensitive adhesive tapes because of the necessity of plasticizing with liquid plasticizers.

We have now found that certain strong, flexible, adherent synthetic polymers prepared by the copolymerization of vinyl esters such as vinyl acetate with certain neutral esters of ethylene-alpha, beta-dicarboxylic acids may be utilized without addition of plasticizers or other deleterious compounding ingredients for the impregnation and unification of paper backings for pressure-sensitive adhesive tapes. These neutral esters are esters of saturated alcohols having the formula:

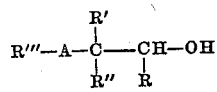

in which R, R' and R'' are hydrogen atoms or saturated alkyl groups, A is oxygen, methylene, or an alkyl methylene group, and R''' is a saturated alkyl or alkoxyalkyl group. Tertiary alcohols are not suitable for this work because their esters are too unstable when heated. Secondary alcohols, where R is an alkyl group, are of somewhat less interest than primary alcohols, where R is hydrogen. The alcohols used should be saturated, that is, they should contain no carbon to carbon double bonds, since ethylene-alpha, beta-dicarboxylic acid esters of unsaturated alcohols would give excessive amounts of cross-linking when copolymerized with the vinyl ester. Di- or polyhydric alcohol esters, being di- or polyfunctional would likewise give excessive amounts of cross-linking when copolymerized with the vinyl ester. However, small amounts of these or other cross-linking agents may be used in combination with the principal monomers, with advantageous results.

The neutral esters to be copolymerized with vinyl acetate are readily prepared by heating a mole of maleic acid or anhydride or of fumaric acid with an excess (more than 2 moles) of the alcohol or alcohols to be used, together with a small amount of acid catalyst, to a temperature above 100° C., and removing the water formed during the reaction by distillation. Para-toluene sulfonic acid is the preferred catalyst for this esterification and it is generally used in amounts ranging from ½-2% based on the maleic acid or anhydride or fumaric acid. In the case of alcohols which are immiscible with water, it is a very simple matter to distill alcohol and water from the reaction mixture, separate the water and return the alcohol to the reaction vessel. In the case of 2-ethoxyethanol, the water formed during the esterification may be removed through a fractionating column. Benzene, toluene, heptane or other volatile, water-immiscible solvents may be added to the reaction mixture to aid in the removal of water if desired. In this way the reaction is readily carried to completion. The excess alcohol, and the volatile solvent if any is used, are removed by distillation and the product may be used for polymerization in this crude form, or it may be purified by washing with a dilute aqueous alkaline solution to remove the catalyst and any unesterified acid, or by distillation under reduced pressure.

In those esterifications starting with fumaric acid, esters of fumaric acid are obtained. When maleic acid or anhydride is used as the starting material the conditions of esterification generally cause some of the maleic acid products to isomerize into corresponding fumaric acid derivatives so that the final product obtained consists of a mixture of the two. It is believed, however, that the amount of fumaric acid ester present in the products prepared from maleic acid or anhydride is small, and accordingly in this specification esters prepared from maleic acid or anhydride are referred to as maleates. The maleate esters may be more completely converted into fumarate esters if desired by any of the common methods, such as by treatment with secondary amines, light, heat, acids, etc.

Commercial vinyl acetate which has been distilled to free it of inhibitor is suitable for these polymerizations. It should be free from excessive amounts of acetaldehyde since the presence of acetaldehyde tends to inhibit the polymerization and to lead to low molecular weight products.

The copolymerizaton of vinyl acetate with these maleic acid and fumaric acid esters is readily carried out by any of the common methods of polymerization. The method of most interest in the preparation of thees copolymers is the so-called emulsion method whereby these products are obtained in a dispersed form. These dispersions are of interest for use directly in the impregnation of paper since this eliminates organic solvents which would increase the cost of operation and introduce explosion hazards. By using such aqueous dispersions it is also possible to use copolymers so highly cross-linked as to be completely insoluble in organic solvents. These dispersions are usually prepared with a solids content of 30-60%.

Any of several commercial emulsifying agents may be used in the preparation of these dispersions, including long chain alkyl sulfate salts, alkyl substituted aryl sulfonic acid salts, soaps and salts of long chain amines. A small amount of a protective colloid may be added to stabilize the dispersion; methyl cellulose, gelatin, methyl starch, polyvinyl alcohol, sodium alginate, and the like may be used. Any of the various water soluble peroxide type catalysts, such as ammonium persulfate, potassium persulfate, hydrogen peroxide or sodium perborate may be used, usually in amounts of 0.1-2%, based on the monomers. The pH during polymerization is generally maintained between 4 and 7. The use of a pH appreciably higher than 7 is to be avoided since an excessive amount of vinyl acetate is hydrolyzed during the polymerization at elevated pH. The polymerizations are generally run at a temperature of between 50° C. and the temperature at which the reaction mixture refluxes gently, although other temperatures may also be used. It is generally preferred to carry out the polymerization at the lowest temperature which will still give an economical rate of reaction since this gives higher molecular weight products. In general, it is possible to complete these polymerizations in from 1 to 6 hours, depending on the composition of the monomers, concentration, amount of catalyst and temperature employed.

By copolymerizing vinyl acetate and maleate or fumarate esters with small amounts of acrylic acid it is possible to prepare dispersions which are very stable to mechanical action and which have a very small particle size. Since acrylic acid is difficult to isolate in pure form it has been found convenient to hydrolyze methyl or ethyl acrylate with an equivalent amount of sodium hydroxide solution to give a sodium acrylate solution. Such a sodium acrylate solution does not polymerize and yields acrylic acid readily on acidification. In order to get the acrylic acid to copolymerize uniformly with the vinyl acetate and maleate or fumarate esters it is necessary to control the pH of the polymerization mixture. In general it is preferred to carry out the polymerization in the presence of these acrylates at a pH between 3.5 and 6. Other equivalent polymerizable carboxylic acids may be substituted for the acrylic acid.

These polymerizations may also be carried out by other known methods, for example the granular method, and the resulting polymers may be dispersed or dissolved in water or organic solvents for use in the impregnation of paper.

We have found that copolymers which have most desirable properties as impregnants and unifying agents for paper backings for pressure-sensitive adhesive tapes have a modulus of elasticity of between 4 and 15 megadynes per square centimeter, although copolymers having a modulus of as low as 2½ or as high as 25 megadynes per square centimeter may be used in some instances. At values lower than 2½ the polymer is too soft and the impregnated paper is not sufficiently unified; at values higher than 25 the polymer is too stiff and the impregnated and unified paper is harsh and brittle.

The modulus of elasticity as here referred to and as specified in the claims is calculated from the stress at 10% elongation as determined on a thin film of the copolymer tested at 25° C. in a Scott Inclined Plane Serigraph, or an equivalent testing apparatus, wherein the time required to obtain 10% elongation is in the range of approximately 1 to 4 seconds.

In many cases, it is desirable to add 0.1-3.0% of a polymerizable material containing two or more polymerizable groups per molecule to the reaction mixture to get a cross-linked copolymer. The use of such a cross-linking agent decreases the solubility of the resulting copolymer, decreases its tendency to stretch, (i. e. increases its modulus of elasticity), increases its strength and decreases its tendency to change in physical properties with change in temperature. Suitable cross-linking agents for use in this manner include the allyl, methallyl and crotyl esters of succinic, maleic, fumaric, adipic, sebacic, phthalic, acrylic, methacrylic, crotonic and cinnamic acids, glycol diacrylate and dimethacrylate, divinyl ether, tung oil and di- or polyfunctional esters made from maleic or fumaric acid with ethylene glycol or other polyhydric alcohol and a monohydric alcohol, such as diamyl ethylene dimaleate.

If desired, small amounts of other vinyl and butadiene compounds may be included in these copolymerizations to modify the properties of the copolymers. Polymerizable compounds of interest in this connection include isoprene, butadiene, isobutylene, vinyl ethers, vinyl chloride, vinylidene chloride, acrylate and methacrylate esters, acrylonitrile, styrene and methyl vinyl ketone. The use of relatively small amounts of isoprene or butadiene in these copolymerizations is often desirable because the products obtained are vulcanizable.

By "unified paper backing" we mean that the paper is saturated with a material which binds or welds the fibers together so that the backing will not split or the fibers pull loose under the force exerted by the eucohesive pressure-sensitive adhesive coating when the adhesive tape product is unwound from rolls or removed from surfaces to which temporarily applied; that is, a fiber unity is present which prevents the unity of the backing from being destroyed by the pull of the adhesive.

The paper backing may be creped, crimped, embossed, molded or otherwise formed so as to provide rugosities or corrugations whereby stretchability and an interrupted contacting surface are secured in the adhesive sheet product to facilitate unwinding from rolls and removal from stacks or surfaces to which temporarily applied, and to facilitate conforming the adhesive sheet to curved or irregular outlines or surfaces to which it may be applied. For purposes of convenience all such paper will be referred to hereafter as "creped paper." A flat, uncreped paper may likewise be employed where stretchability is not needed or wanted.

Any type of paper or paper-like sheet may be used so long as it is sufficiently porous or bibulous to permit of adequate impregnation to result in the desired unification. It may be made in whole or in part from wood, rope or rag fibers, or from other fibrous material, natural or synthetic, adapted to the making of thin flexible sheet material of adequate porosity and tensile strength after impregnation. Fibrous glass sheets, for example, may be suitably unified with the copolymers of our invention.

The invention is not limited to true paper as the backing. Thus a fabric of carded cotton fibres can be used. Various felted fabrics can be employed. All of these are to be understood as embraced within the term "paper" as used in the claims, distinguishing from woven fabrics.

Impregnation of the porous paper sheet may be by any of the methods well known in the art, for example by knife or roll coating, use of squeeze rolls, dipping, or spraying. Where the paper when wet with water is so weak as to break off readily under tension, we prefer to apply a light preliminary treatment by means of mechanically driven squeeze rolls, followed by careful drying, so as to obtain sufficient wet strength for subsequent handling in a saturating tank or the like. Paper having an initial wet strength, such as may be provided by treatment in the beater with various known materials, may however be used where available; and such paper may be completely saturated in a single treatment as will be more fully described.

In general the paper is impregnated with a total amount of copolymer dry solids approximately equal to the dry weight of the paper, although higher or lower coating weights may be used with certain papers or for special purposes. With the dispersions of this invention it is possible to obtain uniform distribution of the solids within the sheet of paper, and not a mere deposition on the surface of the sheet. This results in a desirably high degree of unification. Before this saturation the paper will be very permeable to air, but after saturation the unified paper will have a greatly reduced permeability such that its porosity value, as hereinafter defined, is at least as high as 200 seconds.

In the following examples, all parts are given as parts by weight.

*Example 1*

In this example a heavy porous creped paper is impregnated and unified by means of a cross-linked copolymer of one part of vinyl acetate and two parts of 2-ethylbutyl maleate applied in aqueous dispersion. The unified backing is provided with a pressure-sensitive adhesive coating to yield a pressure-sensitive and satisfactorily unified adhesive tape.

The cross-linked copolymer is prepared as follows: 900 parts of water, 9 parts of Duponol ME (technical sodium lauryl sulfate, produced and sold by E. I. du Pont de Nemours & Co., Inc.), 8 parts of polyvinyl alcohol, 9 parts of sodium bicarbonate and 5 parts of ammonium persulfate are charged into a suitable kettle. The reaction mixture is heated with stirring to form a homogeneous solution at 120° F. Then a mixture of 350 parts of 2-ethylbutyl maleate, 115 parts of vinyl acetate and 10 parts of diamyl ethylene dimaleate is added to the reaction mixture. The diamyl ethylene dimaleate is readily prepared by reacting one mole of ethylene glycol with two moles of maleic anhydride and then completing the esterification with amyl alcohol added in excess, and in the presence of a suitable catalyst such as 1% of p-toluenesulfonic acid, followed by distillation to remove excess unreacted amyl alcohol.

The reaction mixture is heated to 150–155° F. to effect polymerization. After 1 hour at this temperature an additional 20 parts of vinyl acetate is added, with a second and third 20 part portion added after 1½ and 2 hours. After an additional hour at this temperature the reaction mixture is heated during a period of 1 hour to 175° F. and is held at this temperature for an additional hour. Thus the total reaction time is 5 hours. At the end of the reaction, 35 parts of 10% sodium bicarbonate solution is added to the reaction mixture. The non-volatile portion of the dispersion amounts to 35–36%. A dried film is found to be strong and flexible.

This dispersion is utilized in unifying a heavy crepe paper, e. g. "Walpole" crepe, produced by the Hollingsworth and Vose Co. of East Walpole, Mass.; an 85 lb. paper (weighing 85 pounds per ream of 480 sheets 24 x 36 inches) and having approximately 5 major crepe lines per lineal inch, an overall caliper of approximately .020 inch, a porosity of 7 seconds, and a lengthwise tensile strength of about 12.5 lbs. per ½ inch, is used. The porosity is determined on a Gurley Densometer, and indicates the numbers of second required for 400 c. c. of air to pass through a 1⅛ inch diameter single thickness of paper under the conditions provided by that instrument.

The paper is first passed through the dispersion to which has been added one-fifth of its volume of water, and is then passed between squeeze rolls, so as to provide a wet coating weight of 38–40 grains of the dispersion per 24 square inches. The wet paper is then dried in an oven at 120–130° F.; during the first few minutes, the relative humidity in the oven is maintained at 50–75% to permit complete penetration of the dispersed copolymer into the sheet.

After complete drying, the partially treated paper is given a further impregnation with the undiluted dispersion, preferably by a combination of floating on, and dipping through, the dispersion, with the final coating weight again being controlled by means of squeeze rolls. The combination of floating, whereby the dispersion penetrates the sheet and forces out the entrapped air, and dipping, whereby both surfaces of the sheet are well covered with the dispersion, ensures the complete and uniform impregnation of the sheet with the dispersion. Such a method of impregnation is more fully described in U. S. Patent No. 2,227,444, issued January 7, 1941, to R. G. Drew. A wet coating weight of 21–24 grains per 24 square inches is thus obtained; after drying the sheet, it is found to contain a total of 20–25 grains of dry copolymer, and to have a porosity of at least 1000 seconds.

To secure efficient bonding of the pressure-sensitive adhesive to this unified backing, it is found desirable to prime the surface of the sheet. A suitable primer may be made as follows: 63 parts of zinc oxide is milled into 100 parts of light carcass reclaim (such as No. 34 Reclaim Rubber, from Philadelphia Rubber Works Co. of Akron, Ohio, which is a light carcass grey reclaim containing 62% rubber content and having a specific gravity of 1.20), using the customary roller mill employed in the milling of rubber. Separately, 195 parts of zinc resinate (such as "Pale Zitro" resin, a resinate containing 4.8% combined zinc, obtained from Newport Industries, Inc.) is blended with 49 parts of heavy paraffin oil by heating at 400° F. Three hundred twenty six parts of the milled base, 224 parts of the resin-oil blend, and 44.5 parts of pale gum rosin (such as "Nelio N" pale gum rosin from the Glidden Co.) are then mixed in a heavy duty internal mixer of the Werner-Pfleiderer type. A total of 22 parts of a 50% solution of potassium hydroxide, 33 parts of a 25% solution of casein in ammonia water, and 270 parts of water are added, according to known procedures, so as to produce a smooth, uniform dispersion of the rubber-resin-oil mixture in aqueous vehicle. A coating weight of the primer dispersion of 3–4 grains per 24 square inches is then applied by means of a roll coater to one surface of the unified backing, and is suitably dried, to provide an improved bond between the backing and the subsequently applied pressure-sensitive adhesive.

The same light carcass reclaim used in the preparation of the primer may also be used in making the adhesive. To 198.5 parts of the reclaim is first added, by milling, 1.5 parts of a suitable antioxidant (such as "Flectol H", a condensation product of acetone and amiline produced by the Rubber Service Laboratories Division of Monsanto Chemical Co.). Twelve hundred parts of this mill base is then dispersed, together with 142.5 parts of "Nelio N" rosin and 11.4 parts of heavy paraffin oil, in a mixture of 178 parts of ethyl alcohol and 1780 parts of heptane, to form a smooth fluid mass which is subsequently coated, as by means of a suitable knife coater, on the primed unified backing. Approximately 20–21 grains of the dry adhesive residue per 24 square inches is a satisfactory coating weight. Drying is conveniently accomplished by passing the coated sheet through an oven.

The final product may be slit into tape form and wound on its own backing in roll form. The rolls may then subsequently be unwound without danger of lamination or fuzzing of the treated paper backing. The tape is resistant to the action of moisture, organic solvents, and the like; and the adhesive is not softened nor weakened by prolonged contact with the backing.

*Example 2*

While the copolymer described under Example 1 may be used for the unification of various other papers, where lighter weight papers are to be treated for use in Masking tape and the like it is preferred to use the somewhat stronger copolymer hereinafter to be described. This polymer is made as follows:

Twenty four parts of Duponol ME, 14 parts of ammonium persulfate and 35 parts of a 28% sodium acrylate solution are dissolved in 2400 parts of water in a suitable reaction vessel. Seven hundred parts of vinyl acetate and 700 parts of 2-butoxyethyl maleate are added and the pH is adjusted to 5.4. The temperature of the agitated reaction mixture is then raised to 60° C. and is kept between 60 and 70° C. for six hours to complete the polymerization and is then cooled. The pH of about 5.3 is raised to 6.8 by the addition of approximately 150 parts of 10% aqueous sodium bicarbonate solution. The product contains 34% of non-volatile material.

A light weight porous crepe paper, such as "Duracel" crepe having a ream weight of 27 lbs. and a porosity of 3 seconds, is impregnated and unified with the copolymer thus obtained, by methods described under Example 1. In this case, the first treatment, using squeeze rolls, provides sufficient "wet strength" so that the partially treated paper is subsequently able to resist the tension of the machine during the floating and dipping operation without breaking or pulling apart. Where necessary, a further saturation of the sheet may be applied after the float and dip, in order to provide a final dry coating weight of copolymer approximately equal to the original dry weight of the paper, i. e. 10–11 grains per 24 sq. in.

The unified backing thus obtained is primed on both sides with a light coating of the primer described in Example 1. One side is then further coated with a light but essentially continuous coating of shellac, applied as a 35 percent solution in alcohol by means of coating rolls; the resulting dried film of shellac is found to be well bonded to the backing by virtue of the intercalated layer of primer, which also aids in preventing penetration of the shellac through the backing and to the face side where it might subsequently prevent adequate bonding of the pressure-sensitive adhesive to the backing.

The pressure-sensitive adhesive of Example 1 may also be used with the backing of the present example, being coated by means of a knife coater or other suitable means on the primed face side of the unified backing. After final drying, the product may be slit and wound into rolls, and makes a highly satisfactory pressure-sensitive adhesive masking tape.

In the above construction, the shellac coating provides a surface to which the adhesive coating does not readily adhere, and therefore permits easy unwinding of the tape from rolls.

However, where the tape is used in multiple layers, as in masking, the shellac provides sufficient anchorage for the adhesive of the next tape layer so that the tape is enabled to remain in position under such light stresses as are occasioned by the action of a lacquer spray gun. Adhesion of the particular adhesive herein described to the original unified backing of this example prior to priming and shellacking is sometimes so light as to cause trouble with the tape lifting or blowing off under these conditions.

The tape of this example is not affected by changes in atmospheric humidity, and is resistant to the solvent and softening action of the usual lacquer solvents. The adhesive retains its full strength even on long contact with the backing.

*Example 3*

The copolymer of this example is prepared from equal parts of vinyl acetate and 2-ethoxyethyl maleate, with a small proportion of cross-linking agent. It is prepared in aqueous dispersion as follows:

In a reaction vessel equipped with a mechanical stirrer, a thermometer and a condenser, 16 parts of Duponol ME, 12 parts of ammonium persulfate and 45 parts of 28% sodium acrylate solution are dissolved in 1650 parts of water. Nine hundred parts of vinyl acetate, 900 parts of 2-ethoxyethyl maleate and 36 parts of diamyl ethylene dimaleate are added and the pH of the reaction mixture is adjusted to 4.0. The reaction mixture is heated to 65° C., is held at 65 and 70° C. for five hours to effect polymerization and is then cooled. The mixture, which at this point has a pH of 4.6 is raised to a pH of 6.3 by the addition of approximately 150 parts of 10% aqueous sodium bicarbonate solution. The product contains 48% of non-volatile material.

This dispersion is well suited for impregnation of bibulous paper because of its high degree of stability to mechanical action, its small particle size and its high solids content. For example a 27 pound bibulous crepe paper, containing 1% by weight of a melamine-formaldehyde resin to give the paper a high wet strength, may be readily unified and given a high porosity value by saturating with this dispersion in a single "float and dip" operation and then drying.

Such treated paper may be readily converted into tape by applying a shellac backsize from alcohol solution, heating at 125° C. for one hour to improve the unification of the backsized backing and then applying a reclaim adhesive, such as the adhesive of the previous example, to the face side. The finished tape may be slit and wound into rolls.

This tape is superior to previously prepared tapes in being resistant to both water and organic lacquer solvents.

*Example 4*

Vinyl esters other than vinyl acetate may also be used for the preparation of suitable copolymers for impregnating paper to obtain pressure-sensitive adhesive tape backings. In this example a copolymer of vinyl propionate and n-butyl maleate is used.

Two and one-half parts of Duponol ME, 1 part of ammonium persulfate and 5 parts of a 28% sodium acrylate solution are dissolved in 250 parts of water in a suitable reaction vessel. Seventy five parts of vinyl propionate and 25 parts of n-butyl maleate are added and the pH is adjusted to 5.2. Polymerization is effected by heating with stirring to 80–90° C. for four hours. The final pH is raised to 6.8 by the addition of aqueous 10% sodium bicarbonate solution. The resulting dispersion contains about 30% solids.

This dispersion may be used to saturate and unify porous creped paper which in turn may be made into rolls of tape as in Example 2. Such tape possesses very good strength and is superior to previously prepared tapes in being resistant to both water and to lacquer solvents.

While the specific examples given above show only one type of pressure-sensitive eucohesive adhesive, it is to be understood that other adhesives having similar properties may be substituted therefor. Thus, adhesives having a polyisobutylene base, or a base of crude or of synthetic rubber, synthetic resin may be substituted. Similar substitutions may also be made in regard to primers.

Where backsizing materials are required, materials other than shellac or the like may frequently be used to advantage; thus ethyl cellulose applied from solution in a suitable organic solvent may be used.

Having described various embodiments of our invention, for purposes of illustration rather than limitation, what we claim is as follows:

1. A pressure-sensitive adhesive tape having a unified paper backing member comprising a flexible porous paper impregnated and unified by a relatively non-tacky, non-hygroscopic copolymer of vinyl acetate and a neutral ester of an ethylene-alpha, beta-dicarboxylic acid in which at least about half of the carboxylic acid groups are esterified with a saturated beta-alkoxyethanol, said copolymer having a modulus of elasticity between 2½ and 25 megadynes per square centimeter.

2. A pressure-sensitive adhesive tape having a unified paper backing member comprising a flexible porous paper impregnated and unified by a relatively non-tacky, non-hygroscopic copolymer of a vinyl ester and a neutral ester of an ethylene-alpha, beta-dicarboxylic acid having a modulus of elasticity between 2½ and 25 megadynes per square centimeter.

3. A pressure-sensitive adhesive tape having a unified paper backing member comprising a flexible porous paper impregnated and unified by a relatively non-tacky, non-hygroscopic copolymer of a vinyl ester and a neutral ester of an ethylene-alpha, beta-dicarboxylic acid having a modulus of elasticity between 4 and 15 megadynes per square centimeter.

4. A pressure-sensitive adhesive tape having a unified paper backing member comprising a flexible porous paper impregnated and unified by a relatively non-tacky, non-hygroscopic copolymer of a vinyl ester and a neutral ester of an ethylene-alpha, beta-dicarboxylic acid in which at least about half of the carboxylic acid groups are esterified with a saturated beta-alkoxyethanol, said copolymer having a modulus of elasticity between 2½ and 25 megadynes per square centimeter.

5. A pressure-sensitive adhesive tape having a unified paper backing member comprising a flexible porous paper impregnated and unified by a relatively non-tacky, non-hygroscopic copolymer of vinyl acetate and the di-betaalkoxyethyl ester of an ethylene-alpha, beta-dicarboxylic acid having the formula HOOC—CH=CH—COOH, said copolymer having a modulus of elasticity between 2½ and 25 megadynes per square centimeter.

6. A pressure-sensitive adhesive tape having a unified paper backing member comprising a flexible porous paper impregnated and unified by a relatively non-tacky, non-hygroscopic copolymer of vinyl acetate and 2-butoxyethyl maleate, said copolymer having a modulus of elasticity between 2½ and 25 megadynes per square centimeter.

7. A pressure-sensitive adhesive tape having a unified paper backing member comprising a flexible porous paper impregnated and unified by a relatively non-tacky, non-hygroscopic copolymer of vinyl acetate and 2-butoxyethyl maleate in approximately equal parts by weight, said copolymer having a modulus of elasticity between 2½ and 25 megadynes per square centimeter.

8. A pressure-sensitive adhesive tape having a backing member comprising a flexible porous paper impregnated and unified with an approximately equal weight of a copolymer of monomers comprising (a) a neutral vinyl ester and (b) a neutral ester of an ethylene-alpha, beta-dicarboxylic acid, said copolymer having a modulus of elasticity of between 2½ and 25 megadynes per square centimeter.

WILLIAM E. LUNDQUIST.
WALDO KELLGREN.